(12) United States Patent
Coers et al.

(10) Patent No.: US 8,398,469 B2
(45) Date of Patent: Mar. 19, 2013

(54) AGRICULTURAL WORK MACHINE HAVING AN UNLOADING SYSTEM FOR UNLOADING AN AGRICULTURAL PRODUCT

(75) Inventors: Bruce A. Coers, Hillsdale, IL (US); Daniel J. Burke, Cordova, IL (US); Ryan P. Mackin, Milan, IL (US)

(73) Assignee: Deere & Company, Moline, IL (US)

( * ) Notice: Subject to any disclaimer, the term of this patent is extended or adjusted under 35 U.S.C. 154(b) by 544 days.

(21) Appl. No.: 12/169,805

(22) Filed: Jul. 9, 2008

(65) Prior Publication Data
US 2010/0009731 A1 Jan. 14, 2010

(51) Int. Cl.
*A01F 12/46* (2006.01)

(52) U.S. Cl. ............ 460/114; 701/50; 56/16.6; 198/313; 198/812

(58) Field of Classification Search ............ 56/16.6; 701/50; 460/114, 115; 193/6, 30; 414/523; 198/812, 595, 860.3, 535–536, 671, 311, 198/313
See application file for complete search history.

(56) References Cited

U.S. PATENT DOCUMENTS

| | | | | |
|---|---|---|---|---|
| 3,643,828 A * | 2/1972 | Elliott | | 414/699 |
| 3,825,107 A * | 7/1974 | Cary et al. | | 198/313 |
| 4,813,526 A * | 3/1989 | Belanger | | 198/313 |
| 5,355,062 A * | 10/1994 | Takizawa et al. | | 318/568.1 |
| 5,498,119 A * | 3/1996 | Faivre | | 414/528 |
| 5,857,907 A * | 1/1999 | Underwood | | 460/114 |
| 6,233,911 B1 | 5/2001 | Dillon | | |
| 6,871,483 B1 * | 3/2005 | Panoushek | | 56/10.2 E |
| 7,752,779 B2 * | 7/2010 | Schoenmaker et al. | | 37/348 |
| 2002/0011060 A1 | 1/2002 | Dillon | | |
| 2005/0224439 A1 * | 10/2005 | Bean et al. | | 212/280 |
| 2007/0012548 A1 * | 1/2007 | Yang et al. | | 198/812 |
| 2010/0016047 A1 * | 1/2010 | Coers et al. | | 460/114 |

FOREIGN PATENT DOCUMENTS
EP 1250832 A1 10/2002

OTHER PUBLICATIONS
European Search Report dated Mar. 17, 2010, (9 pages).

* cited by examiner

*Primary Examiner* — Alicia Torres
(74) *Attorney, Agent, or Firm* — Taylor IP, P.C.

(57) ABSTRACT

An agricultural work machine for performing harvesting operations. The agricultural work machine includes a support structure. An unloading system is coupled to the support structure and is configured to transport an agricultural product received from a hopper to an off-machine location. The unloading system includes a transfer assembly having a discharge chute. A positioning system is configured to adjust at least one of an elevation, a length and a rotational position of the transfer assembly to position the discharge chute. A control system is configured to automatically locate the discharge chute from a stowed position to a desired unload position of a plurality of preset unload positions upon receiving an operator input via an operator input device.

23 Claims, 8 Drawing Sheets

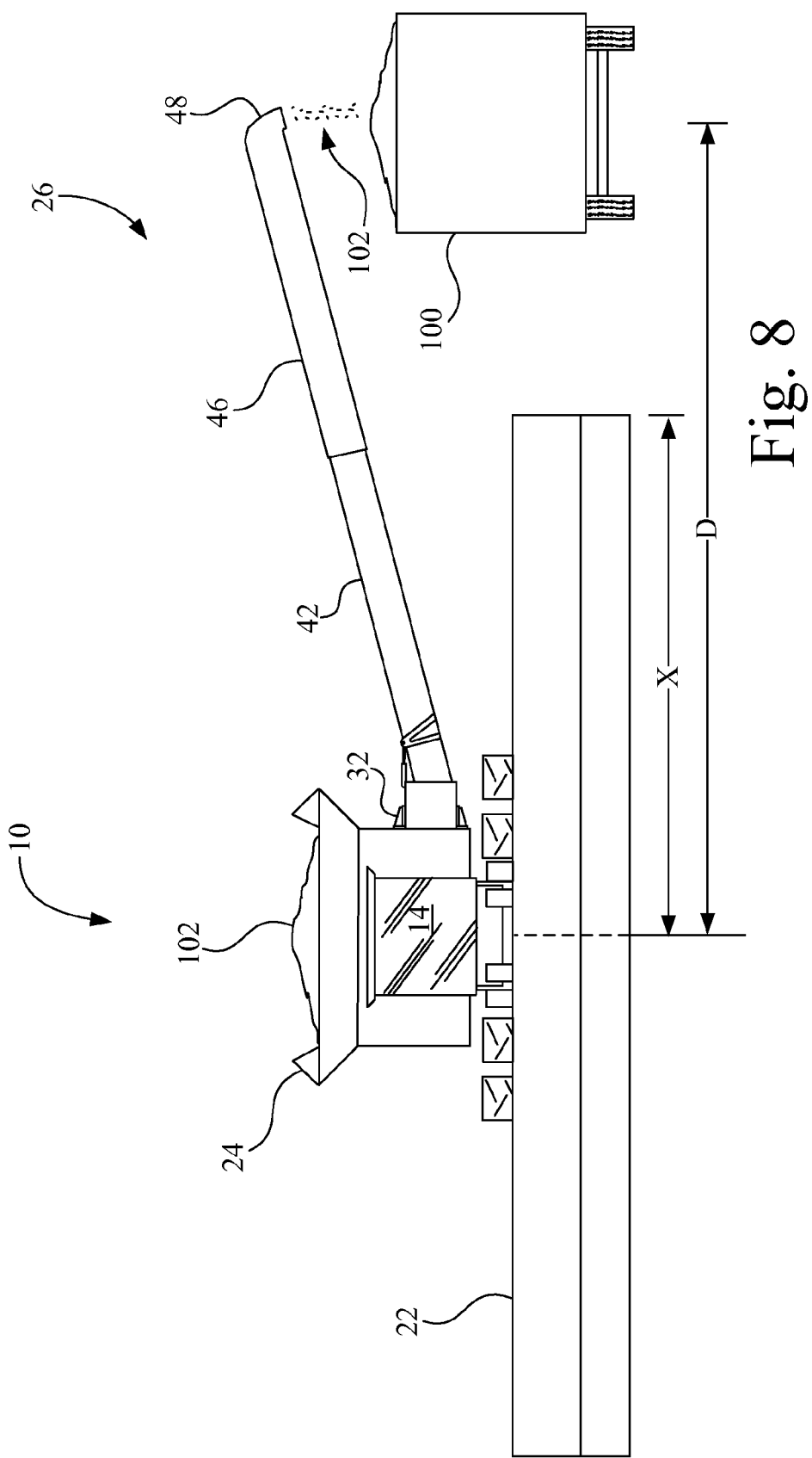

AGRICULTURAL WORK MACHINE HAVING AN UNLOADING SYSTEM FOR UNLOADING AN AGRICULTURAL PRODUCT

FIELD OF THE INVENTION

The present invention relates to an agricultural work machine, and, more particularly, to an agricultural work machine having an unloading system for unloading an agricultural product from the agricultural work machine to an off-machine location.

BACKGROUND OF THE INVENTION

Agricultural work machines, such as combines, are employed in the agricultural industry for various tasks, including harvesting crops. During harvesting operations, typical such agricultural work machines move through a crop field while operating a header at the front of the work machine to cut or gather the crop. The agricultural product, e.g., grain, is then removed from the non-grain crop materials by threshing, separating and cleaning assemblies on the work machine, and then the grain is transferred to the work machine's hopper for temporary storage.

At various times during harvesting operations, such as when the work machine's hopper is full, the operator of the work machine will unload the agricultural product from the work machine using a cantilevered unloading system that is mounted on the work machine. Typically, the agricultural product is unloaded via the unloading system into a mobile agricultural product carrier, such as a tractor pulled hopper wagon (grain cart), a truck, or a tractor-trailer, which delivers the agricultural product to a storage facility or to another transport system. At times, the mobile agricultural product carrier may travel beside the work machine during simultaneous harvesting and unloading operations. Typically, the cantilevered unloading system pivots to swing away from a stowed position to a fixed pivot position, and some systems may be manually adjusted from the fixed pivot position with respect to the fore/aft (lengthwise) position of the unloading point. However, this arrangement limits an operator's ability to compensate for different grain cart sizes or header widths.

Accordingly, there is a need in the art for an improved work machine and unloading system for unloading an agricultural product from the work machine.

SUMMARY OF THE INVENTION

The present invention provides a work machine and unloading system for unloading an agricultural product from a work machine.

The invention, in one form thereof, is directed to an agricultural work machine for performing harvesting operations. The agricultural work machine includes a support structure. A hopper is coupled to the support structure. The hopper is configured to store an agricultural product during the harvesting operations. An unloading system is coupled to the support structure. The unloading system is configured to transport the agricultural product received from the hopper to an off-machine location. The unloading system includes a turret configured to facilitate rotation. A transfer assembly has a proximal end and a distal end, with the proximal end being coupled to the turret and the distal end having a discharge chute. A positioning system is configured to adjust at least one of an elevation, a length and a rotational position of the transfer assembly to position the discharge chute. A control system is coupled to the positioning system. The control system has an operator input device. The control system is configured to automatically locate the discharge chute from a stowed position to a desired unload position of a plurality of preset unload positions upon receiving an operator input via the operator input device.

The invention, in another form thereof, is directed to an agricultural work machine for performing harvesting operations. The agricultural work machine includes a support structure. A hopper is coupled to the support structure. The hopper is configured to store an agricultural product during the harvesting operations. An unloading system is coupled to the support structure. The unloading system is configured to transport the agricultural product received from the hopper to an off-machine location. The unloading system includes a turret configured to facilitate rotation. A telescopic transfer assembly has a proximal end and a distal end, with the proximal end being coupled to the turret. The telescopic transfer assembly includes a base conveyor system and an extension conveyor system. The extension conveyor system is configured to move relative to the base conveyor system. The extension conveyor system has a discharge chute located at the distal end. A lift mechanism is coupled to the telescopic transfer assembly and configured to adjust an elevation of the telescopic transfer assembly to position the discharge chute. An extend/retract mechanism is coupled between the base conveyor system and the extension conveyor system to adjust a length of the telescopic transfer assembly to position the discharge chute. A swing mechanism is coupled to the turret to adjust a rotational position of the telescopic transfer assembly to position the discharge chute. A control system is coupled to the lift mechanism, the extend/retract mechanism and the swing mechanism to adjust an unload position of the discharge chute of the telescopic transfer assembly.

The invention, in another form thereof, is directed to a method for programming a control system of an unloading system with a plurality of preset unload positions associated with a discharge chute of a transfer assembly. The method includes (a) receiving operator inputs to operate a positioning system to position the discharge chute of the transfer assembly at a current desired unload position; (b) receiving sensor data to determine position data including at least one of a current elevation, a current length, and a current rotational position of the transfer assembly associated with the current desired unload position of the discharge chute; (c) storing the position data associated with the current desired unload position in a memory as a preset unload position; and (d) assigning an input button of the operator input device to the preset unload position.

The invention, in another form thereof, is directed to a method for operating an unloading system of an agricultural work machine in an unloading mode. The method includes (a) receiving an operator input to select one of a plurality of preset unload positions as a current desired position of a discharge chute of a transfer assembly; (b) retrieving position data associated with the current desired position of the discharge chute; (c) operating a positioning system to position the discharge chute of the transfer assembly at the current desired position; and (d) receiving sensor data to monitor movement of the discharge chute of the transfer assembly to the current desired position.

BRIEF DESCRIPTION OF THE DRAWINGS

FIG. 8 depicts the agricultural work machine of FIG. 1 while operating the unloading system to unload agricultural product from the work machine in accordance with an embodiment of the present invention.

DETAILED DESCRIPTION OF THE INVENTION

Figure 1:
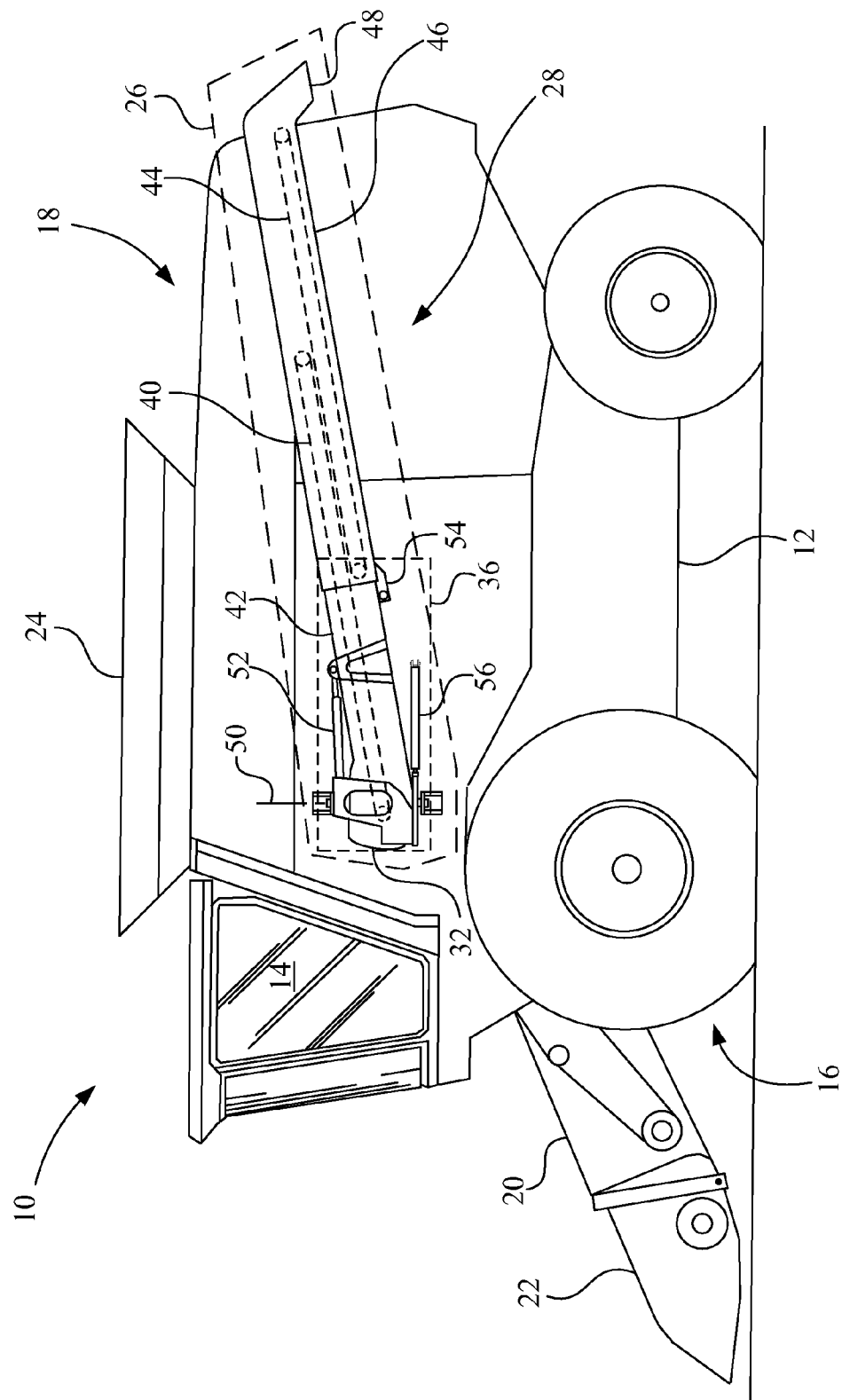
FIG. 1 depicts an agricultural work machine with an unloading system in accordance with an embodiment of the present invention.

Referring now to the drawings, and more particularly to FIG. 1, there is shown a work machine 10 in the form of a self-propelled agricultural combine that includes a supporting structure 12, e.g., a frame. An elevated operator's station 14 is coupled to supporting structure 12 at the front of work machine 10. A propulsion unit 16, which may include an engine and drive train, tires and/or tracks that engage the ground G, is coupled to supporting structure 12, and performs propulsion and/or steering functions. As used herein, the term "coupled" refers to either of direct or indirect attachment. A harvesting assembly 18 is coupled to supporting structure 12, and is configured to perform harvesting functions (e.g., cutting and/or gathering, threshing, separating, cleaning, and transfer).

Harvesting assembly 18 may include a feeder house 20, a harvesting platform, i.e., header, 22 attached to feeder house 20, a hopper 24, and an unloading system 26. Header 22 may be configured in a known manner to cut and/or gather the crop being harvested, which is transferred to threshing, separating and cleaning assemblies (not shown) of harvesting assembly 18 that separate the agricultural product, e.g., grain, from the chaff. Hopper 24 is configured to receive and store the agricultural product during harvesting operations. Unloading system 26 is configured to receive the agricultural product from hopper 24 and is configured to transfer the agricultural product received from hopper 24 from work machine 10 to an off-machine location. In FIG. 1, unloading system 26 is depicted in a stowed, i.e., home, position 28.

Figure 2:
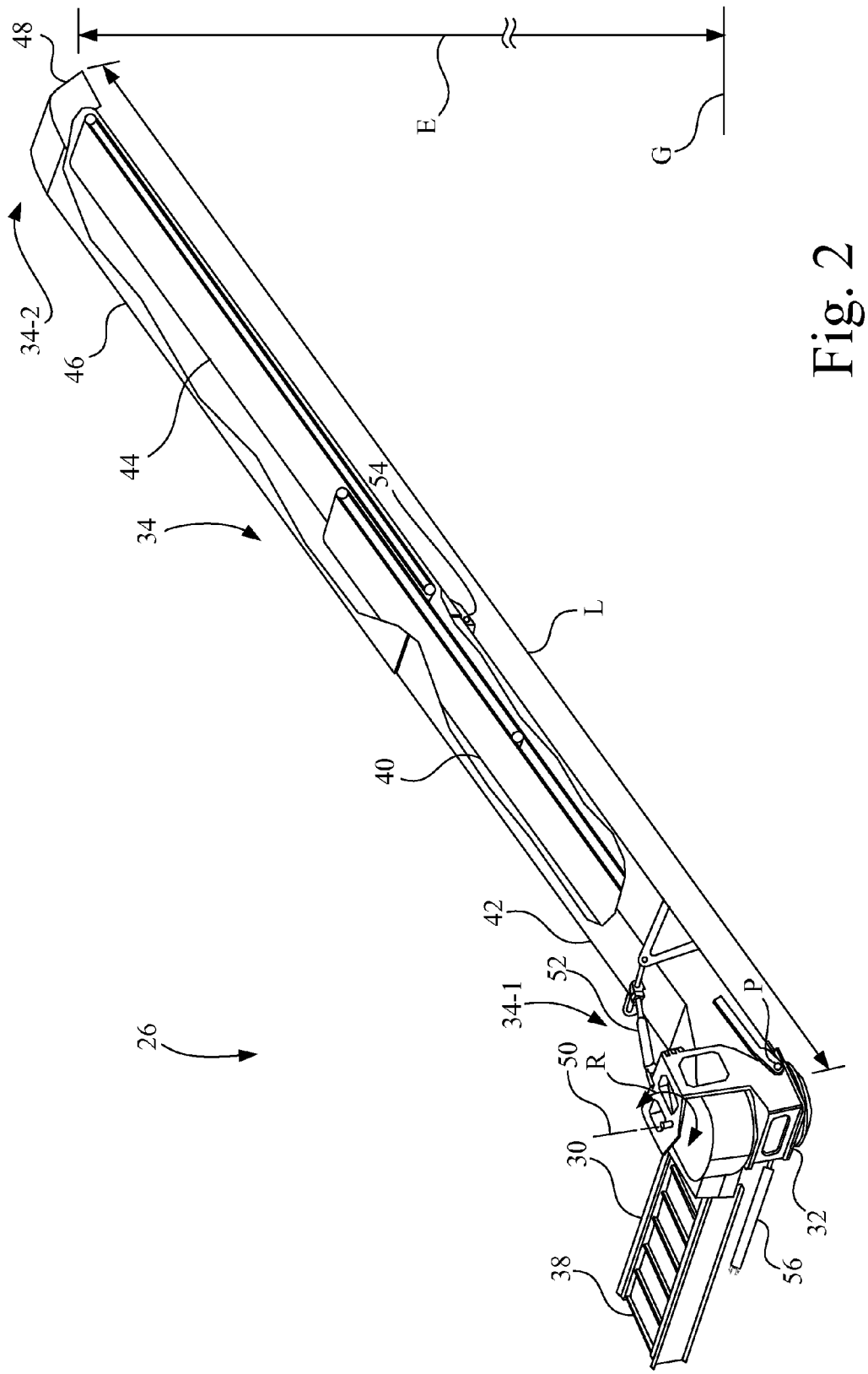
FIG. 2 depicts an unloading system for an agricultural work machine in accordance with the embodiment of FIG. 1.

Referring also to FIG. 2, unloading system 26 in accordance with an embodiment of the present invention is depicted. Unloading system 26 may include a first stage delivery system 30, a turret 32, a telescopic second stage transfer assembly 34, and a positioning system 36 (see FIG. 1).

First stage delivery system 30 is positioned at the bottom of or below hopper 24, and is configured to receive the agricultural product from hopper 24 and convey it to second stage transfer assembly 34. In the present embodiment, first stage delivery system 30 employs a conveyor belt 38 to transport the agricultural product, although it will be understood that other systems for conveying materials may be employed, e.g., auger-based systems.

Second stage transfer assembly 34 has a proximal end 34-1 and a distal end 34-2. Second stage transfer assembly 34 may include a base conveyor (e.g., belt) system 40, a base support structure 42, an extension conveyor (e.g., belt) system 44, an extension structure 46, and a discharge chute 48. Discharge chute 48 is located at distal end 34-2 of second stage transfer assembly 34. It is considered that in other embodiments, auger-based systems may be employed instead of and/or in addition to conveyor belt systems. In any event, second stage transfer assembly 34 is configured to receive the agricultural product from first stage delivery system 30, and to unload the agricultural product from work machine 10 to an off-machine location by discharging it to an agricultural product carrier via discharge chute 48.

In the present embodiment, second stage transfer assembly 34 may be a telescopic assembly that is configured to selectively move in three ranges of motion, i.e., elevation E, length L, and rotation R so as to position discharge chute 48 at a desired unload position (elevation E, length L, and rotational position RP) of a plurality of preset unload positions. It is contemplated, however, that some embodiments may include less that all three of these ranges of motion. In the present embodiment, stowed (home) position 28 for second stage transfer assembly 34 may be in terms of a predefined length L, a predefined elevation E and a predefined rotational position RPn of second stage transfer assembly 34.

Turret 32 is configured to facilitate rotation, and is coupled to supporting structure 12 of work machine 10. More particularly, turret 32 is configured to rotatably couple second stage transfer assembly 34 at proximal end 34-1 to supporting structure 12 of work machine 10, for example, so as to permit second stage transfer assembly 34 to rotate through rotation R about an axis 50, e.g., a substantially vertical axis, from stowed position 28 to a desired rotational position.

Base conveyor system 40 of second stage transfer assembly 34 is configured to convey the agricultural product away from first stage delivery system 30 and turret 32, and toward discharge chute 48. Extension conveyor system 44 is configured to extend the reach of unloading system 26 beyond that of base conveyor system 40, and is configured to receive the agricultural product from base conveyor system 40 and to convey the agricultural product away from base conveyor system 40 and into discharge chute 48.

Base support structure 42 is pivotably coupled to turret 32 at proximal end 34-1 via a pivot joint P so as to allow second stage transfer assembly 34 to pivot up or down in order to change the elevation E of (i.e., raise or lower) discharge chute 48. In addition, base support structure 42 is configured to support at least in part base conveyor system 40. For example, one end of base conveyor system 40 may be supported directly by turret 32, whereas the other end of base conveyor system 40 may be supported by base support structure 42.

Extension structure 46 supports extension conveyor system 44, and hence is slidably attached to base support structure 42 and configured to extend from base support structure 42, e.g., in a manner somewhat similar to that of an extension ladder, which provides second stage transfer assembly 34 with telescopic capability. As seen in FIG. 2 both base support structure 42 and extension structure 46 define an enclosed space or a confined space over length L in a direction normal to the direction in which length L is defined.

Figure 3:
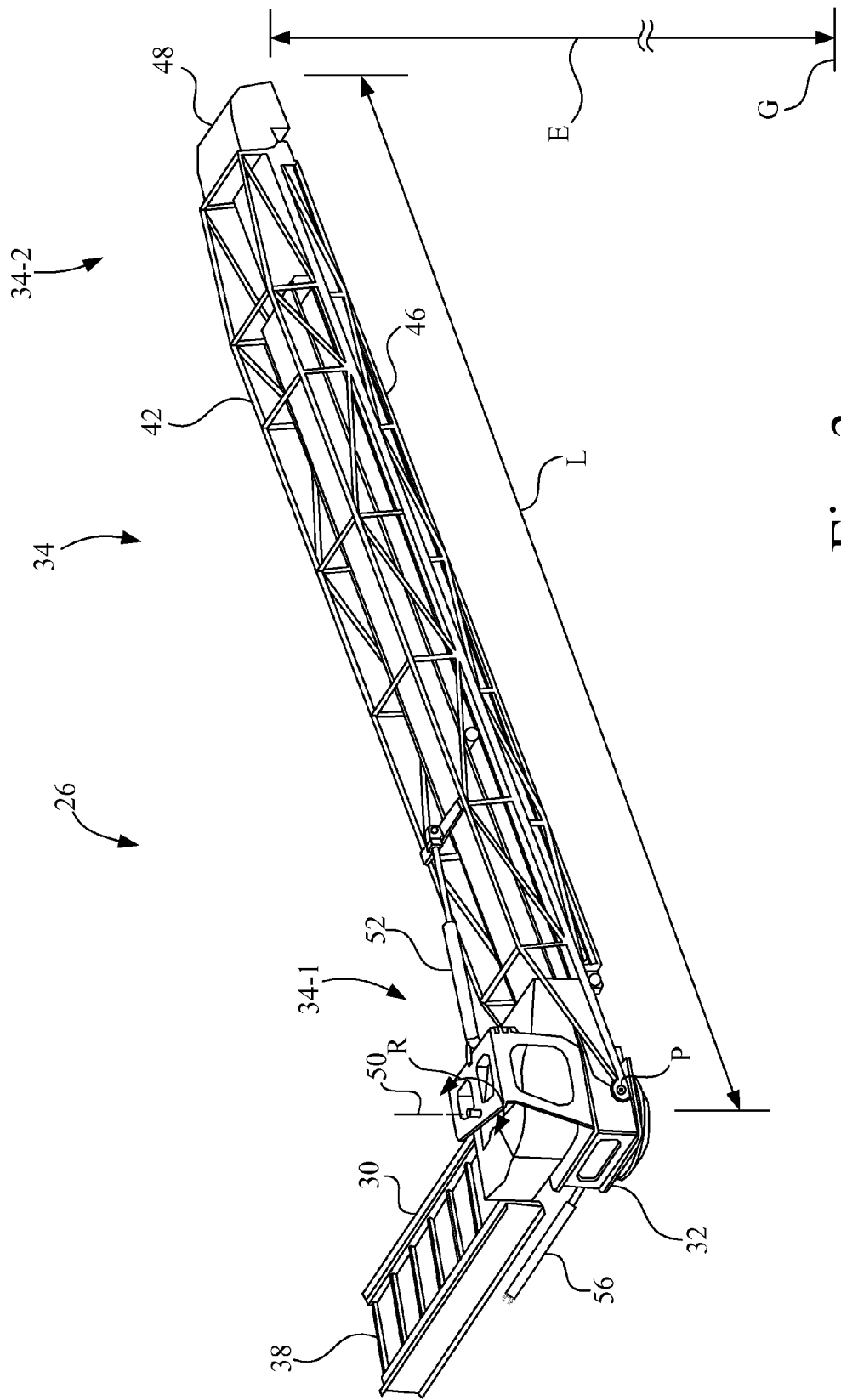
FIG. 3 depicts another embodiment of an unloading system in accordance with the present invention.

As depicted in FIG. 2, base support structure 42 and extension structure 46 are formed as an extruded metal structure, e.g., an aluminum extrusion. However, other structures may be employed without departing from the scope of the present invention. For example, with reference to FIG. 3, base support structure 42 and extension structure 46 may be in the form of truss structures. In the depiction of FIG. 3, extension structure 46 is slidably coupled to the bottom of base support structure 42, whereas in the embodiment of FIG. 2, extension structure 46 is slidably coupled to and partially envelops base support structure 42. As seen in FIG. 2 as extension structure 46 is extended and retracted relative to base support structure 42 the partial enveloping of base support structure 42 extends respectively over less and more of the length of unloading system 26. Along this length where extension structure 46 overlaps base support structure 42, base conveyor system 40 and extension conveyor system 44 are both enclosed (as discussed in the previous paragraph) twice, once by base support structure 42 and once by extension structure 46. The twice enclosed portion also twice encloses the agricultural product passing within support structure 42 and extension structure 46.

Figure 4A:
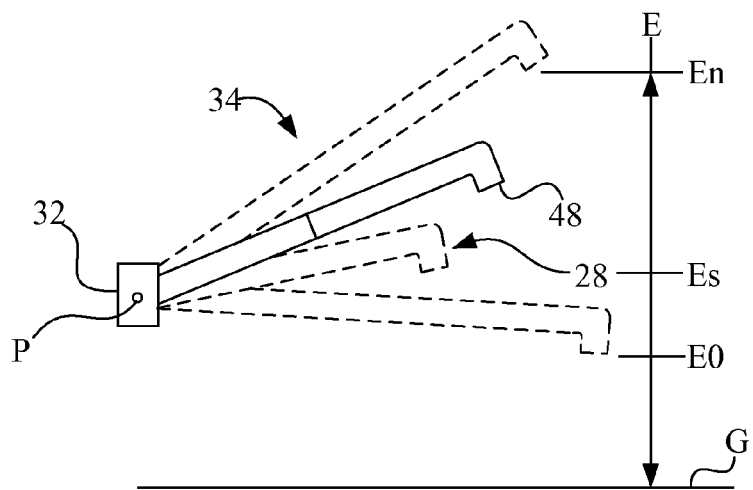
FIGS. 4A, 4B and 4C depict various positions of the second stage transfer assembly of the unloading system of FIG. 1 in terms of elevation, length and rotational position.
Figure 4B:
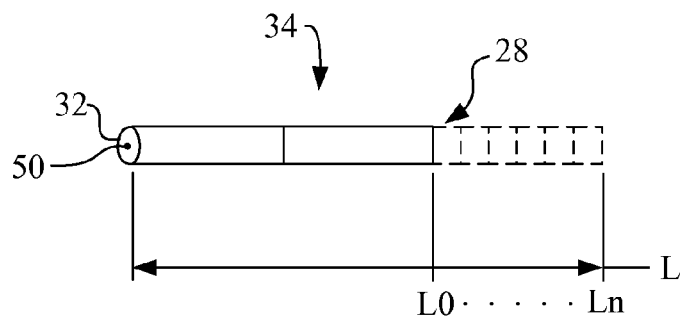
Figure 4C:
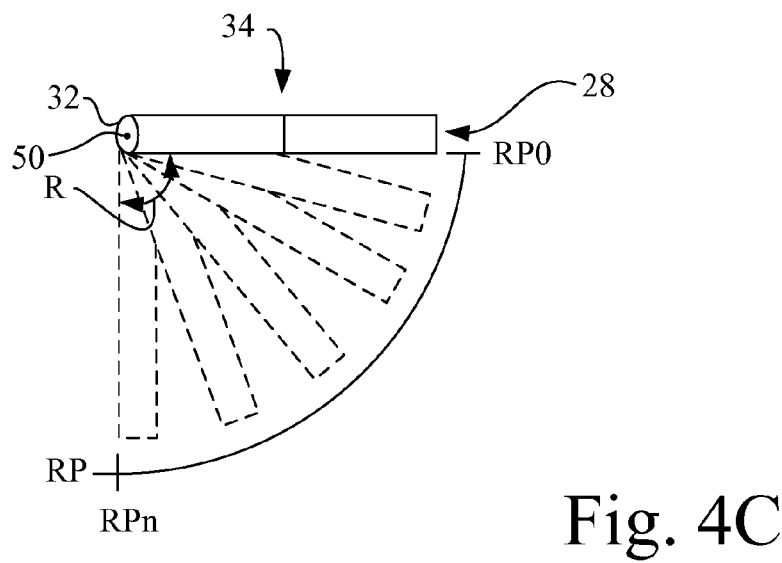

Referring to FIGS. 4A-4C, with respect to second stage transfer assembly 34, elevation E may be described as a continuous range from elevation E0 to elevation En, with elevation E0 being the minimum elevation (e.g., a distance above the ground G), elevation ES being the elevation at stowed position 28 and elevation En being the maximum elevation. Length L may be described as a continuous range from length L0 to length Ln, with length L0 being the minimum length (e.g., at stowed position 28) and length Ln being the maximum length. Rotational position RP may be described as a continuous range from rotational position RP0 to rotational position RPn, with rotational position RP0 being the rotational position at stowed position 28 and rotational position RPn being the maximum rotational position away from stowed position 28.

Referring also again to FIGS. 1 and 2, in the present embodiment, positioning system 36 includes a lift mechanism 52, an extend/retract mechanism 54 and a swing mechanism 56.

Lift mechanism 52 may be, for example, in the form of a hydraulic cylinder that is coupled to the telescopic second stage transfer assembly 34 and to support structure 12. Lift mechanism 52 is configured to adjust the elevation E of discharge chute 48 of second stage transfer assembly 34 in the range of E0 through En to position discharge chute 48. For example, lengthening the hydraulic cylinder serving as lift mechanism 52 causes the elevation E of telescopic second stage transfer assembly 34 at distal end 34-2 to decrease, whereas shortening the hydraulic cylinder serving as lift mechanism 52 causes the elevation E of the telescopic second stage transfer assembly 34 at distal end 34-2 to increase.

Extend/retract mechanism 54 is coupled between base conveyor system 40 and extension conveyor system 44 to adjust a length L of the telescopic second stage transfer assembly 34, i.e., at discharge chute 48, in the range of L0 through Ln to position discharge chute 48. Extend/retract mechanism 54 may be implemented, for example, as a fixed chain coupled to base conveyor system 40 and a motor (e.g., hydraulic or electric) with a driven sprocket coupled to extension conveyor system 44, with the sprocket engaged with the chain. Depending on the rotational direction of the sprocket, the telescopic second stage transfer assembly 34 will extend (lengthen) or retract (shorten).

Alternatively, extend/retract mechanism 54 may be implemented by a hydraulic cylinder, or some other rotational-to-translational movement conversion apparatus.

Swing mechanism 56 may be, for example, in the form of a hydraulic cylinder that is coupled to turret 32 to adjust a rotational position RP of the telescopic second stage transfer assembly 34 in a range of RP0 through RPn relative to stowed position 28 of the telescopic second stage transfer assembly 34 to position discharge chute 48 by effecting the rotation R about axis 50. For example, lengthening the hydraulic cylinder serving as swing mechanism 56 causes the telescopic second stage transfer assembly 34 to move away from stowed (home) position 28, whereas shortening the hydraulic cylinder serving as swing mechanism 56 causes the telescopic second stage transfer assembly 34 to move away from a non-stowed position toward stowed position 28.

Figure 5:
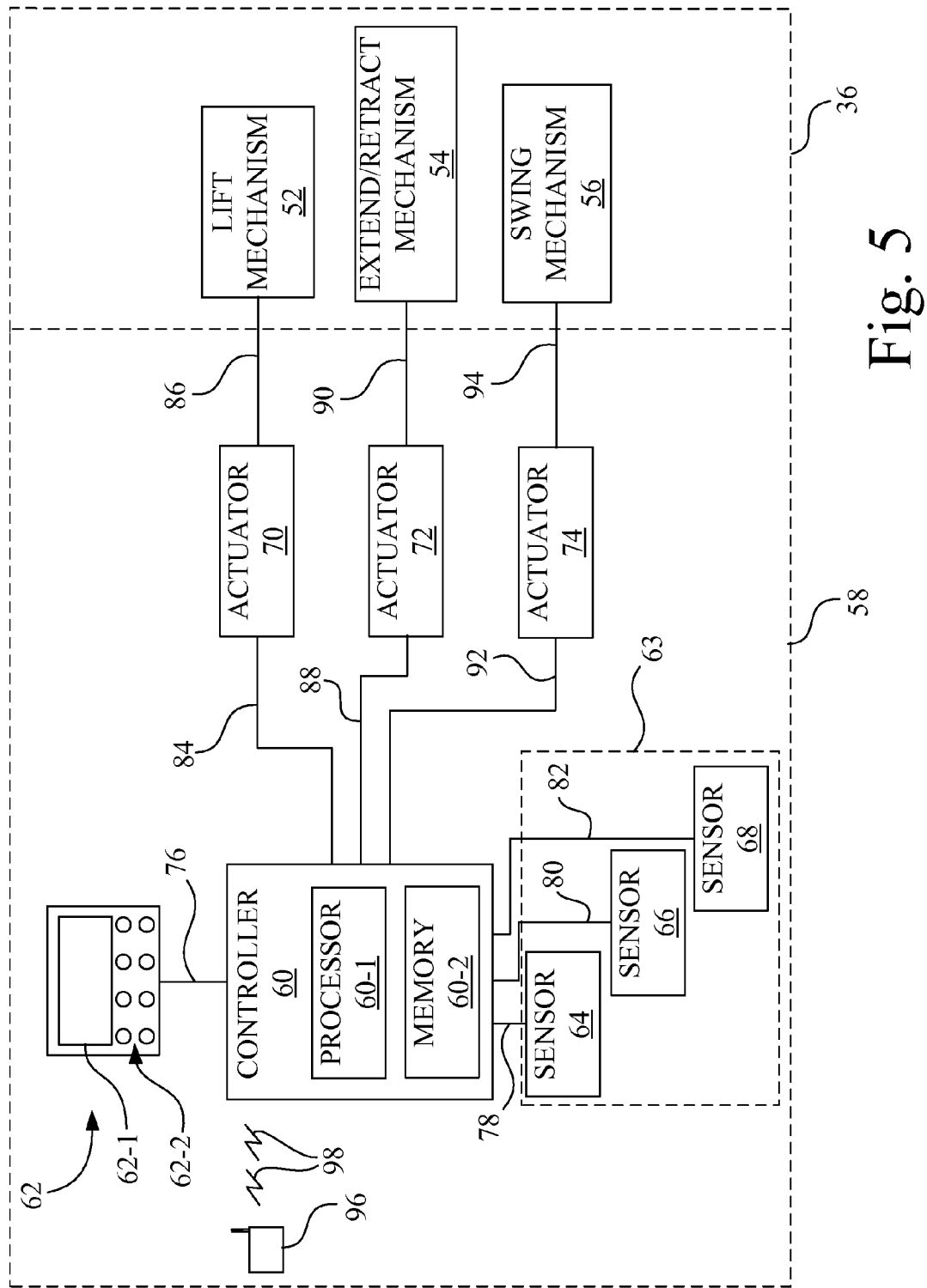
FIG. 5 shows a block diagram of a control system connected to a positioning system for effecting the various positions of the second stage transfer assembly depicted in FIGS. 4A, 4B and 4C.

Referring to FIG. 5, there is shown a control system 58 of unloading system 26 configured in accordance with an embodiment of the present invention to control positioning system 36, e.g., one or more of lift mechanism 52, extend/retract mechanism 54 and swing mechanism 56, to adjust an operating position of discharge chute 48 of second stage transfer assembly 34 (see FIGS. 1-4C). For example, control system 58 may be configured to automatically locate discharge chute 48 from stowed position 28 to a desired unload position of a plurality of preset unload positions.

Control system 58 includes a controller 60, an operator input device 62, a position sensing system 63 (including sensor 64, a sensor 66, and a sensor 68), an actuator 70, an actuator 72 and an actuator 74.

Controller 60 is a programmable device, and may include, for example, programmable processor 60-1 and a memory 60-2, as well as power, interface, etc., components not illustrated. Controller 60 may be in the form of an application specific integrated circuit (ASIC), or may be formed by discrete components, or a combination thereof.

Operator input device 62 is communicatively coupled to controller 60 via communications link 76. As used herein, the term "communications link" refers to a communication channel, which may be formed by one of wired or wireless connections. Operator input device 62 may be, for example, a user interface having a display screen 62-1 and control buttons 62-2. Control buttons 62-2 may be physical buttons, or may be virtual buttons formed on display screen 62-1. Control buttons 62-2 may be used, for example, in programming controller 60 with the plurality of preset unload positions, as well as in selection of the desired unload position from the plurality of preset unload positions. Display screen 62-1 may be used, for example, to display the current position of the telescopic second stage transfer assembly 34, and to post informational and warning messages.

Sensor 64 is communicatively coupled to controller 60 via communications link 78. Sensor 64 is located to detect an elevation E of the telescopic second stage transfer assembly 34, such as the elevation E at discharge chute 48. Sensor 64, for example, may be formed integral with the hydraulic cylinder forming lift mechanism 52, or may be a rotary encoder wheel/wheel reader unit, or other position sensing arrangement.

Sensor 66 is communicatively coupled to controller 60 via communications link 80. Sensor 66 is located to detect a length L of the telescopic second stage transfer assembly 34. Sensor 66, for example, may be formed integral with the hydraulic cylinder forming extend/retract mechanism 54, or may be a rotary encoder wheel/wheel reader unit, or other position sensing arrangement.

Sensor 68 is communicatively coupled to controller 60 via communications link 82. Sensor 68 is located to detect the rotational position RP of telescopic second stage transfer assembly 34. Sensor 68, for example, may be formed integral with the hydraulic cylinder forming swing mechanism 56, or may be a rotary encoder wheel/wheel reader unit, or other position sensing arrangement.

Actuator 70 is communicatively coupled to controller 60 via communications link 84. Actuator 70 may be, for example, an electrically controlled device, such as an electrically controlled hydraulic valve. Actuator 70 may be communicatively coupled to lift mechanism 52 of positioning system 36 via a hydraulic link 86.

Actuator 72 is communicatively coupled to controller 60 via communications link 88. Actuator 72 may be, for example, an electrically controlled device, such as an electrically controlled hydraulic valve. Actuator 72 may be coupled to extend/retract mechanism 54 of positioning system 36 via a hydraulic link 90.

Actuator 74 is communicatively coupled to controller 60 via a communications link 92. Actuator 74 may be, for example, an electrically controlled device, such as an electrically controlled hydraulic valve. Actuator 72 may be coupled to swing mechanism 56 of positioning system 36 via a hydraulic link 94.

In addition, or as an alternative, to operator input device 62, user inputs may be received from a remote device 96 via a wireless link 98. Thus, remote device 96 may serve as an alternate operator input device, and may be operated, for example, by the operator of a mobile agricultural product carrier 100 (see FIG. 8), e.g., a tractor-pulled grain cart, a truck, a tractor-trailer outfit, etc.

Figure 6:
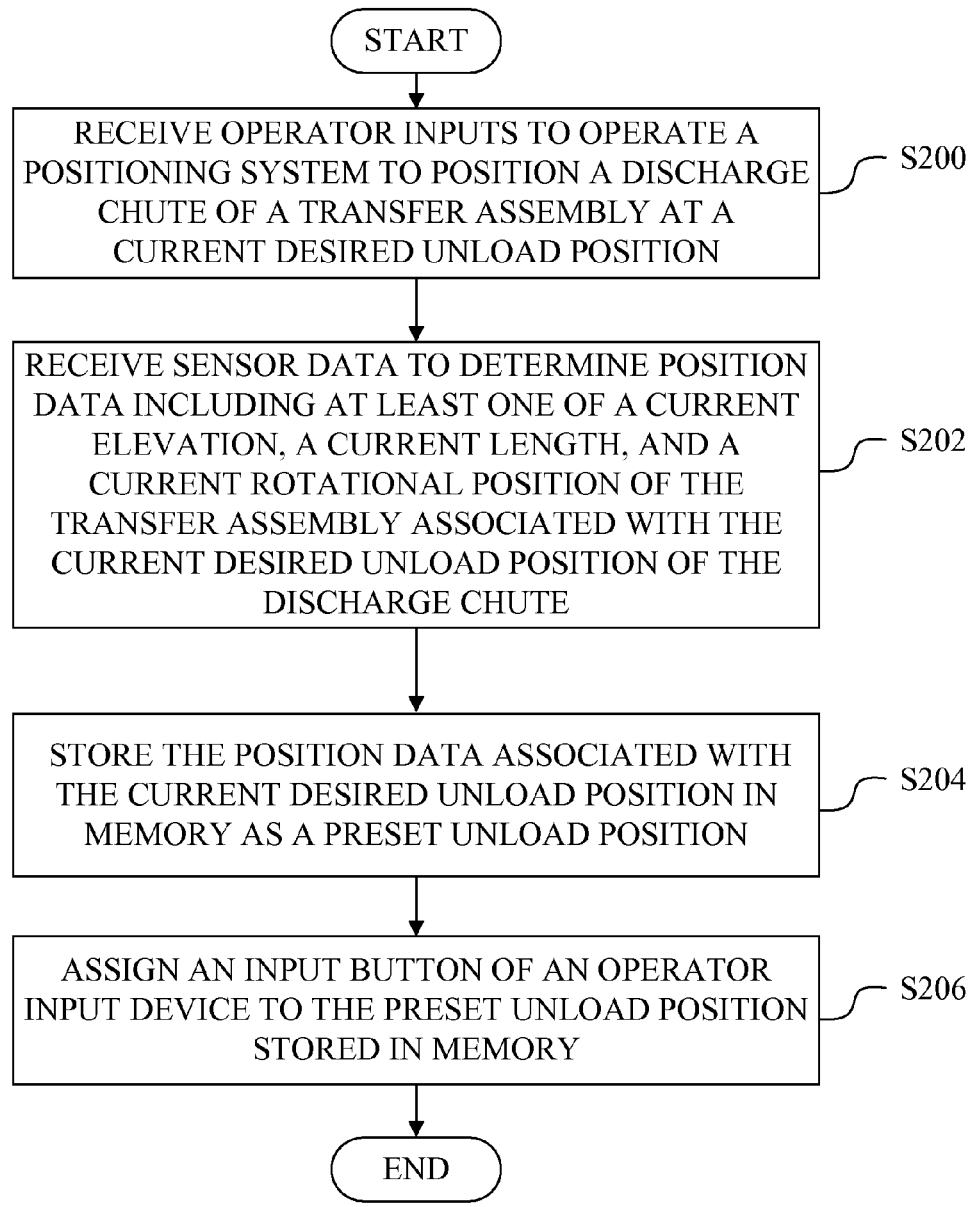
FIG. 6 shows a flowchart of an exemplary process for programming the control system of FIG. 5 with preset unload positions associated with the discharge chute of the second stage transfer assembly.

Referring to the flowchart of FIG. 6, prior to field use, it may be useful to program controller 60 with at least one, and likely a plurality, of preset unload positions associated with discharge chute 48 of second stage transfer assembly 34. Accordingly, controller 60 may be configured to operate in a program mode to define preset unload positions of discharge chute 48 of second stage transfer assembly 34, for example, in terms of elevation E, length L, and rotational position RP. In this regard, controller 60 executes program instructions via processor 60-1 to operate in the program mode.

At act S200, controller 60 receives operator inputs via operator input device 62 to manually operate positioning system 36, e.g., to control at least one of lift mechanism 52, extend/retract mechanism 54, and swing mechanism 56, to position discharge chute 48 of second stage transfer assembly 34 at a current desired unload position.

At act S202, controller 60 receives sensor data from position sensing system 63 to determine position data including at least one of a current elevation E, a current length L, and a current rotational position RP of second stage transfer assembly 34 associated with the current desired unload position of discharge chute 48.

At act S204, controller 60 is operated to store the position data associated with the current desired unload position in memory 60-2 as a preset unload position.

At act S206, controller 60 assigns an input button of the control buttons 62-2 of operator input device 62 to the preset unload position stored in memory 60-2.

Acts S200 through S206 may be repeated respectively for each of a plurality of desired unload positions of discharge chute 48 of second stage transfer assembly 34. Doing so, for example, may facilitate the assignment of a corresponding plurality of preset unload positions, and the forming of an association of the plurality of preset unload positions with one or more of the respective control buttons 62-2 of operator input device 62.

In some embodiments, at least one of the plurality of preset unload positions may define a default position of discharge chute 48 of second stage transfer assembly 34 for a particular crop being harvested, e.g., corn, soybeans, etc. Further, at least one of the plurality of preset unload positions may define a default position of discharge chute 48 of second stage transfer assembly 34 for a particular mobile agricultural product carrier, such as a grain cart, truck, tractor-trailer, etc.

Also, at least one of the plurality of preset unload positions may define a default position of the discharge chute 48 of second stage transfer assembly 34 for a particular type of field practice. For example, during the opening of a field, it may be useful to position discharge chute 48 of second stage transfer assembly 34 at the proper elevation E and length L to accommodate a rear unloading. As another example, in the field practice of using a tram line, i.e., a predefined path in the field for all mobile equipment so as to reduce overall field compaction, discharge chute 48 of second stage transfer assembly 34 may be positioned at the proper elevation E, length L and rotational position RP to center discharge chute 48 on the tram line at the proper elevation E.

Figure 7:
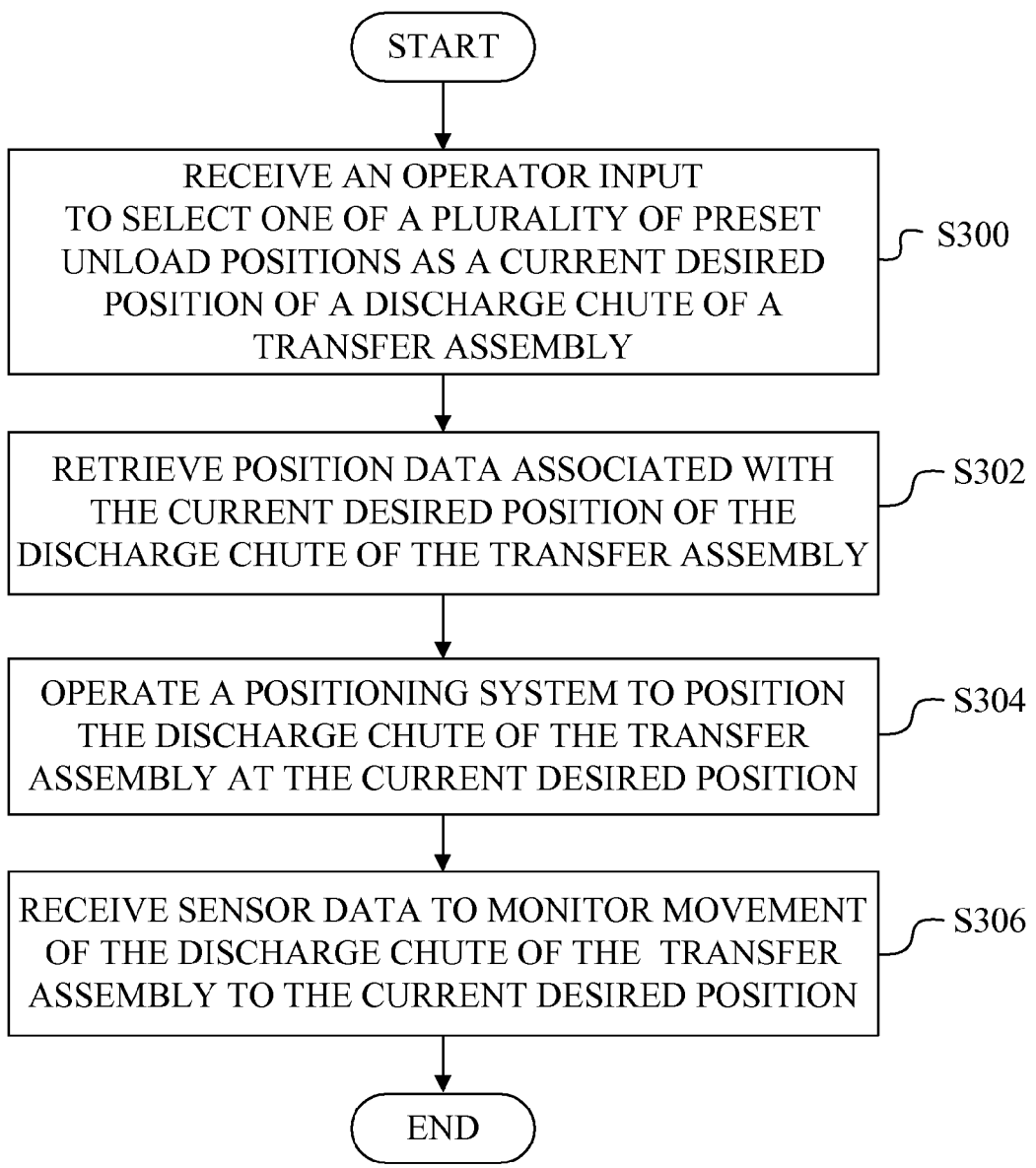
FIG. 7 shows a flowchart of an exemplary process utilized by the control system when configured to operate in an unloading mode.

Referring to the flowchart of FIG. 7, during field use, controller 60 may be configured to operate in an unloading mode. In this regard, controller 60 executes program instructions via processor 60-1 to operate in the unloading mode, and perform the following acts to effect an automatic positioning of discharge chute 48 of second stage transfer assembly 34 at a current desired position.

At act S300, controller 60 receives an operator input via operator input device 62 to select one of the plurality of preset unload positions as a current desired position of discharge chute 48 of second stage transfer assembly 34.

At act S302, controller 60 retrieves from memory 60-2 the position data associated with the current desired position of discharge chute 48 of second stage transfer assembly 34.

At act S304, controller 60 operates positioning system 36 to position discharge chute 48 of second stage transfer assembly 34 at the current desired position. For example, with reference to FIGS. 2 and 8, in order to unload the agricultural product, e.g., grain 102, from hopper 24, lift mechanism 52, extend/retract mechanism 54, and/or swing mechanism 56 are actuated, such that the second stage transfer assembly 34 is automatically elevated to a desired elevation E, lengthened to a desired length L, and rotated to a desired rotational position RP. The amount that second stage transfer assembly 34 is extended may be dependent, for example, on the extent X of header 22 and a distance, e.g., distance D, to mobile agricultural product carrier 100.

At act S306, controller receives sensor data from position sensing system 63 to monitor movement of discharge chute 48 of second stage transfer assembly 34 to the current desired position. It is to be understood that the position feedback provided by act S306 may be provided in a closed loop manner, such that acts S304 and S306 occur together, so as to avoid overshoot of the desired position.

At acts 304 and 306, the act of operating may involve controlling each of lift mechanism 52, extend/retract mechanism 54, and swing mechanism 56 of positioning system 36 to position discharge chute 48 of second stage transfer assembly 34 at the current desired position. As such, in some embodiments it may be desirable to sequentially operate lift mechanism 52, extend/retract mechanism 54 and swing mechanism 56, in that order, to prevent the premature rotation of second stage transfer assembly 34. However, in other embodiments, it may be desirable to operate lift mechanism 52, extend/retract mechanism 54 and swing mechanism 56 simultaneously to speed up the process of positioning discharge chute 48 of second stage transfer assembly 34 at the current desired position. In still other embodiments, it may be desirable to operate lift mechanism 52, extend/retract mechanism 54 and swing mechanism 56 in a combination of sequential and simultaneous operation to position discharge chute 48 of second stage transfer assembly 34 at the current desired position.

Referring again to FIGS. 2 and 8, once discharge chute 48 is appropriately positioned over mobile agricultural product carrier 100, conveyor belt 38 of first stage delivery system 30 is engaged. Grain 102 from hopper 24 falls onto conveyor belt 38 and is transported towards base conveyor system 40 of second stage transfer assembly 34. Base conveyor system 40 receives the grain from conveyor belt 38 and conveys it to extension conveyor system 44 of second stage transfer assembly 34. Extension conveyor system 44 then conveys the grain to discharge chute 48, which directs grain 102 downward into mobile agricultural product carrier 100.

Having described the preferred embodiment, it will become apparent that various modifications can be made without departing from the scope of the invention as defined in the accompanying claims.

The invention claimed is:

1. An agricultural work machine for performing harvesting operations, comprising:
   a support structure;
   a hopper coupled to said support structure, said hopper being configured to store an agricultural product during said harvesting operations; and
   an unloading system coupled to said support structure, said unloading system being configured to transport said agricultural product received from said hopper to an off-machine location, said unloading system including:
   a turret configured to facilitate rotation;
   a telescoping transfer assembly having a proximal end and a distal end, said proximal end being coupled to said turret, said distal end having a discharge chute, said transfer assembly conveying said agricultural product therewithin, said distal end partially enveloping said proximal end thereby twice enclosing said agricultural product where said distal end partially envelopes said proximal end;
   a positioning system configured to adjust at least one of an elevation, a length and a rotational position of said transfer assembly to position said discharge chute; and
   a control system coupled to said positioning system, said control system having an operator input device, said control system being configured to automatically locate said discharge chute from a stowed position to a desired unload position of a plurality of preset unload positions upon receiving an operator input via said operator input device, said control system including a controller including a programable processor and a memory; and
   a position sensing system including:
   a first sensor communicatively coupled to said controller and located to detect said elevation of said transfer assembly;
   a second sensor communicatively coupled to said controller and located to detect said length of said transfer assembly; and
   a third sensor communicatively coupled to said controller and located to detect said rotational position of said transfer assembly.

2. The agricultural work machine of claim 1, wherein said position sensing system is located to sense at least one of said elevation, said length and said rotational position of said transfer assembly relative to a current position of said discharge chute; and
   wherein said controller is configured to operate in a program mode to execute program instructions to perform the acts of:
   (a) receiving operator inputs via said operator input device to operate said positioning system to position said discharge chute of said transfer assembly at a current desired unload position;
   (b) receiving sensor data from said position sensing system to determine position data including at least one of a current elevation, a current length, and a current rotational position of said transfer assembly associated with said current desired unload position of said discharge chute;
   (c) storing said position data associated with said current desired unload position in said memory as a preset unload position; and
   (d) assigning an input button of said operator input device to said preset unload position.

3. The agricultural work machine of claim 2, wherein said controller performs the acts (a), (b), (c) and (d) in a repeated manner for each of a plurality of desired unload positions of said discharge chute of said transfer assembly to assign said plurality of preset unload positions.

4. The agricultural work machine of claim 1, wherein at least one of said plurality of preset unload positions defines a default position of said discharge chute of said transfer assembly for a particular crop being harvested.

5. The agricultural work machine of claim 1, wherein at least one of said plurality of preset unload positions defines a default position of said discharge chute of said transfer assembly for a particular mobile agricultural product carrier.

6. The agricultural work machine of claim 1, wherein at least one of said plurality of preset unload positions defines a default position of said discharge chute of said transfer assembly for a particular type of field practice.

7. The agricultural work machine of claim 1, wherein said position sensing system is located to sense at least one of said elevation, said length, and said rotational position of said transfer assembly relative to a current position of said discharge chute; and
   wherein said controller being configured to operate in an unloading mode to execute program instructions to perform the acts of:
   (a) receiving said operator input via said operator input device to select one of said plurality of preset unload positions as a current desired position of said discharge chute of said transfer assembly;
   (b) retrieving from said memory position data associated with said current desired position of said discharge chute;
   (c) operating said positioning system to position said discharge chute of said transfer assembly at said current desired position; and
   (d) receiving sensor data from said position sensing system to monitor movement of said discharge chute of said transfer assembly to said current desired position.

8. The agricultural work machine of claim 7, wherein at least one of said plurality of preset unload positions defines a default position of said discharge chute of said transfer assembly for at least one of a particular crop being harvested, a particular mobile agricultural product carrier, and a particular type of field practice.

9. The agricultural work machine of claim 1, wherein said operator input is alternatively from a remote device.

10. The agricultural work machine of claim 9, wherein said remote device is operated by an operator of a mobile agricultural product carrier.

11. An agricultural work machine for performing harvesting operations, comprising:
    a support structure;

a hopper coupled to said support structure, said hopper being configured to store an agricultural product during said harvesting operations; and an unloading system coupled to said support structure, said unloading system being configured to transport said agricultural product received from said hopper to an off-machine location, said unloading system including:

a turret configured to facilitate rotation;

a telescopic transfer assembly having a proximal end and a distal end, said proximal end being coupled to said turret, said telescopic transfer assembly including a base conveyor system and an extension conveyor system, said extension conveyor system being configured to move relative to said base conveyor system, said extension conveyor system having a discharge chute located at said distal end, said telescopic transfer assembly conveying said agricultural product therewithin, said distal end partially enveloping said proximal end thereby twice enclosing said agricultural product where said distal end partially envelopes said proximal end;

a lift mechanism coupled to said telescopic transfer assembly and configured to adjust an elevation of said telescopic transfer assembly to position said discharge chute;

an extend/retract mechanism coupled between said base conveyor system and said extension conveyor system to adjust a length of said telescopic transfer assembly to position said discharge chute; and a swing mechanism coupled to said turret to adjust a rotational position of said telescopic transfer assembly to position said discharge chute; and a control system coupled to said lift mechanism, said extend/retract mechanism and said swing mechanism to adjust an unload position of said discharge chute of said telescopic transfer assembly, said control system including:

a controller including a programmable processor and a memory;

an operator input device communicatively coupled to said controller;

a first sensor communicatively coupled to said controller and located to detect said elevation of said telescopic transfer assembly;

a second sensor communicatively coupled to said controller and located to detect said length of said telescopic transfer assembly;

a third sensor communicatively coupled to said controller and located to detect said rotational position of said telescopic transfer assembly;

a first actuator communicatively coupled to said controller and coupled to said lift mechanism;

a second actuator communicatively coupled to said controller and coupled to said extend/retract mechanism; and a third actuator communicatively coupled to said controller and coupled to said swing mechanism.

12. The agricultural work machine of claim 11, wherein said controller is configured to operate in a program mode to execute program instructions to perform the acts of:

(a) receiving operator inputs via said operator input device to operate at least one of said lift mechanism, said extend/retract mechanism and said swing mechanism to position said discharge chute of said telescopic transfer assembly at a current desired unload position;

(b) receiving sensor data from said first sensor, said second sensor, and said third sensor to determine position data including a current elevation, a current length, and a current rotational position of said telescopic transfer assembly associated with said current desired unload position of said discharge chute;

(c) storing said position data associated with said current desired unload position in said memory as a preset unload position; and (d) assigning an input button of said operator input device to said preset unload position.

13. The agricultural work machine of claim 12, wherein said controller performs the acts (a), (b), (c) and (d) in a repeated manner for each of a plurality of desired unload positions of said discharge chute of said telescopic transfer assembly to assign a corresponding plurality of preset unload positions.

14. The agricultural work machine of claim 13, wherein at least one of said plurality of preset unload positions defines a default position of said discharge chute of said telescopic transfer assembly for a particular crop being harvested.

15. The agricultural work machine of claim 13, wherein at least one of said plurality of preset unload positions defines a default position of said discharge chute of said telescopic transfer assembly for a particular mobile agricultural product carrier.

16. The agricultural work machine of claim 13, wherein at least one of said plurality of preset unload positions defines a default position of said discharge chute of said telescopic transfer assembly for a particular type of field practice.

17. The agricultural work machine of claim 11, wherein said controller is configured to operate in an unloading mode to execute program instructions to perform the acts of:

(a) receiving an operator input via said operator input device to select one of a plurality of preset positions as a current desired position of said discharge chute of said telescopic transfer assembly;

(b) retrieving from said memory an elevation, a length, and a rotational position associated with said current desired position;

(c) operating at least one of said lift mechanism, said extend/retract mechanism and said swing mechanism to position said discharge chute of said telescopic transfer assembly at said current desired position; and (d) receiving sensor data from each of said first sensor, said second sensor and said third sensor to monitor movement of said discharge chute of said telescopic transfer assembly to said elevation, said length, and said rotational position associated with said current desired position.

18. The agricultural work machine of claim 17, wherein said operating involves controlling each of said lift mechanism, said extend/retract mechanism and said swing mechanism to position said discharge chute of said telescopic transfer assembly at said current desired position.

19. The agricultural work machine of claim 18, wherein said lift mechanism, said extend/retract mechanism and said swing mechanism are operated sequentially in that order to position said discharge chute of said telescopic transfer assembly at said current desired position.

20. The agricultural work machine of claim 18, wherein said lift mechanism, said extend/retract mechanism and said swing mechanism are operated simultaneously to position said discharge chute of said telescopic transfer assembly at said current desired position.

21. The agricultural work machine of claim 18, wherein said lift mechanism, said extend/retract mechanism and said swing mechanism are operated in a combination of sequential and simultaneous operation to position said discharge chute of said telescopic transfer assembly at said current desired position.

22. The agricultural work machine of claim 17, wherein said operator input is alternatively from a remote device.

23. A method for operating an unloading system of an agricultural work machine in an unloading mode, comprising:
   (a) receiving an operator input to select one of a plurality of preset unload positions as a current desired position of a discharge chute of a transfer assembly;
   (b) retrieving position data associated with said current desired position of said discharge chute;
   (c) operating a positioning system to position said discharge chute of said transfer assembly at said current desired position; and
   (d) receiving sensor data to monitor movement of said discharge chute of said transfer assembly to said current desired position, said sensor data being supplied by a plurality of sensors, said plurality of sensors being communicatively coupled to a controller, said plurality of sensors being located to detect a length of said transfer assembly, elevation of said transfer assembly, and a rotational position of said transfer assembly, said transfer assembly being telescopically extendable, said transfer assembly conveying an agricultural product therewithin, said transfer assembly having a base support structure that is slidably coupled to an extension structure, said extension structure partially enveloping said base support structure thereby twice enclosing said agricultural product where said extension structure envelopes said base support structure.

* * * * *